(12) United States Patent  (10) Patent No.: US 7,571,025 B2
Bischoff  (45) Date of Patent: Aug. 4, 2009

(54) METHOD AND DEVICE FOR CONTROLLING MANIPULATORS

(75) Inventor: Rainer Bischoff, Augsburg (DE)

(73) Assignee: KUKA Roboter GmbH, Augsburg (DE)

( * ) Notice: Subject to any disclaimer, the term of this patent is extended or adjusted under 35 U.S.C. 154(b) by 773 days.

(21) Appl. No.: 11/141,899

(22) Filed: Jun. 1, 2005

(65) Prior Publication Data

US 2005/0273198 A1    Dec. 8, 2005

(30) Foreign Application Priority Data

Jun. 2, 2004    (DE) ........................ 10 2004 026 813

(51) Int. Cl.
 *G05B 19/418* (2006.01)
(52) U.S. Cl. ........................ 700/248; 700/245; 700/246; 700/250; 700/251; 700/253; 318/568.1; 318/568.11; 318/568.13; 318/568.14; 318/568.16; 219/121.6; 219/121.63; 219/121.64; 219/124.33; 219/125.1; 74/490.01; 74/490.02; 74/490.05; 74/490.06; 74/479.01; 901/4; 901/9; 901/29; 901/42; 901/43; 702/82; 702/167
(58) Field of Classification Search ................. 700/248, 700/245, 246, 250, 251, 253, 254, 255, 257, 700/259, 260, 262, 264; 219/121.6, 121.63, 219/121.64, 124.33, 125.1; 318/568.1, 568.11, 318/568.13, 568.14, 568.16, 568.21, 568.23; 901/4, 9, 29, 42, 43, 47, 50; 74/490.01, 490.02, 74/490.05, 490.06, 479.01; 702/82, 467; 414/736; 409/224

See application file for complete search history.

(56) References Cited

U.S. PATENT DOCUMENTS 4,372,721 A    2/1983 Harjar et al.
5,297,238 A *  3/1994 Wang et al. ................. 700/259
5,380,978 A *  1/1995 Pryor ..................... 219/121.64
2002/0013675 A1  1/2002 Knoll et al.

FOREIGN PATENT DOCUMENTS

DE        198 26 395 A1    12/1999

(Continued)

OTHER PUBLICATIONS

Ananthanarayanan et al., Identification of Kinematic Parameters of Multiple Closed Chain Robotic Manipulators Working in Coordination Proceeding of the 1992 IEEE, Apr. 1992, pp. 358-363.
Bonitz et al., Calibrating a Multi-manipulator Robotic System IEEE Robotics & Automation Magainze, Mar. 1997, pp. 18-22.
Huang et al., Calibration of Two Cooperative Manipulators Via Pseudo-Closed-Loop Method, IEEE International Conference of Beijing, China, Jun. 1996, pp. 1465-1470.

(Continued)

*Primary Examiner*—Khoi Tran
*Assistant Examiner*—McDieunel Marc
(74) *Attorney, Agent, or Firm*—McGlew and Tuttle, P.C.

(57) ABSTRACT

A method for controlling a plurality of manipulators, such as multiaxial or multiaxle industrial robots. At least one manipulator functions as the reference manipulator and is moved in a plurality of preset poses within its working area at which internal position values are determined as first desired poses. For each desired pose, subsequently a first actual pose of the reference manipulator is determined by an external measuring system. Subsequently at least one further manipulator moves up to specific poses of the reference manipulator as second desired poses and for each of these poses an actual pose of the further manipulator is determined by an external measuring system. On the basis of actual-desired deviations between the thus determined desired and actual poses of the two manipulators, subsequently a parameter model for the further manipulator is established and with it it is possible to compensate simultaneously both its own errors and those of the reference manipulator. The method can be used in conjunction with a simplified, improved cooperation between manipulators.

29 Claims, 6 Drawing Sheets

FOREIGN PATENT DOCUMENTS

| | | |
|---|---|---|
| DE | 198 54 011 A1 | 5/2000 |
| DE | 101 53 049 A1 | 5/2003 |
| DE | 10 2004 026814.2 | 6/2004 |
| EP | 0 511 396 A | 11/1992 |
| EP | 1 090 722 A2 | 4/2001 |

OTHER PUBLICATIONS

Kosuge et al., Calibration of Coordinate System for Decentralized Coordinated Motion Control of Multiple Manipulators, IEEE International Conference on Leuven, Belgium, May 1998, pp. 3297-3302.

* cited by examiner

US 7,571,025 B2

METHOD AND DEVICE FOR CONTROLLING MANIPULATORS

FIELD OF THE INVENTION

The invention relates to a method for controlling a plurality of manipulators, such as multiaxial or mutiaxle industrial robots, whereof at least one functions as a reference manipulator and at least one other as a copy or copying manipulator, which is intended to take over the positioning and path travel characteristics of the reference manipulator. The invention also relates to a device for improving the precision or accuracy characteristics of manipulators.

BACKGROUND OF THE INVENTION

In order to improve the positioning accuracy of manipulators, particularly multiaxial industrial robots, in the past the aim has been to produce ever more accurate models of the manipulators. The parameters of such models are determined during a surveying or calibrating process, which is normally carried out once by the manipulator manufacturer. Typically this involves fixing to a hand flange of the robot an auxiliary means permitting a precise determination of the position, i.e. the location and orientation, normally referred to hereinafter as the "pose" of the flange in space. For example use can be made of reference plates having known features determinable by a camera or laser tracking system. Alternatively use is made of other known measuring systems, such as filament or wire measuring systems, etc.

As a result of regularly occurring imprecisions, e.g. elasticities of transmissions and structural elements of the robot, as well as a lack of dimensional stability thereof, the above-described, highly precise, external position measurement of the flange gives a different value compared with a parallel-performed, internal measurement of position values of the manipulator, e.g. by means of angle measuring means integrated into the joints thereof and which for pose determination are linked with a subsequent model calculation, the so-called forward transformation. The deviations derived from the thus determined position difference at the different locations of the working area of a manipulator are subsequently used for establishing a so-called "absolutely accurate robot model", which is significantly more accurate than a theoretical "standard model" of the robot. This makes it possible to improve the absolute positioning accuracy of a multiaxial industrial robot from a few millimetres when using the standard model to less than one millimetre when using an absolutely accurate robot model.

In a parallel German patent application of the same applicant ("method and device for improving the positioning accuracy of a manipulator"; official filing number 102004026814.2), whose content is made into part of the disclosure of the present application, methods and devices for determining the above-described absolute accuracy of a multiaxial industrial robot are described. As a function of an external measuring system for minimizing deviations the manipulator is moved into an end pose essentially corresponding to a preset pose and subsequently internal position values of the manipulator are used in said end pose for parametrizing the absolutely accurate model. In this way it is possible to improve the positioning accuracy of manipulators on the basis of absolutely accurate control models for such a manipulator and in particular this makes possible the replacement of a random robot in a robot cell (working cell) by a different robot.

An important field of use of such absolutely accurate robots is cooperation between several robots. During such a cooperation two or more robots are simultaneously operated with respect to a workpiece, e.g. one robot holding and moving the workpiece, whilst the other robot carries out welding thereon. Alternatively it is e.g. possible for two robots to simultaneously transport an object, or one robot transfers to another robot an object during a movement. As it is assumed that an absolutely accurately measured robot can reach any point of its working area with a toleratable accuracy, it is regularly concluded that a measurement of a base coordinate system for one robot with respect to another robot is sufficient in order to allow a desired, cooperative movement.

However, it has been found that even the absolutely accurate measurement of robots is not generally sufficient in order to allow a problem-free use of several cooperating robots. The smallest deviations from the necessary tolerances e.g. give rise to large forces in a workpiece carried by two robots, the tools and on the actual robots and this can have serious damage consequences. One possible solution would be to compensate robot, tool and component tolerances by a flexible coupling of the tools, but this cannot be implemented for cost reasons. In addition, as a result of the ever more complex uses of cooperating robots by teaching (online programming) or afterteaching of an offline-produced robot control program, it is not possible to bring about a desired, exact program sequence in economic manner.

The problem of the invention is to permit an efficient operation of cooperating manipulators, such as multiaxial industrial robots, whilst avoiding the aforementioned disadvantages.

SUMMARY OF THE INVENTION

According to the invention this problem is solved by a method for controlling a plurality of manipulators, such as multiaxial industrial robots, whereof at least one functions as a reference manipulator and at least one other as a copying manipulator, in which:

a) the reference manipulator is moved into a plurality of predetermined poses within its working area and for determining internal position values of the reference manipulator in the same as first desired poses, b) for each desired pose from step a), an associated pose of the reference manipulator is determined as the first actual pose by an external measuring system, c) the copying manipulator advances to the poses determined by the reference manipulator as second desired poses, d) for each pose advanced to in step c), one pose of the copying manipulator is determined as the second actual pose by an external measuring system and e) a parameter model for the copying manipulator is determined from actual-desired deviations between the first desired and actual poses (of the reference manipulator) and second desired and actual poses (of the copying manipulator) for the simultaneous compensation of errors of both the copying manipulator and errors of the reference manipulator.

The set problem is also solved by an inventive device for improving accuracy characteristics of manipulators, such as multiaxial industrial robots, having:

at least two manipulators, at least one control device for moving the manipulators into predetermined desired poses, at least one external measuring system for determining actual poses of the manipulators corresponding to the given desired poses, a comparator device for determining a deviation between the desired and actual poses of a manipulator and a model forming device for determining a parameter model of at least one of the manipulators from the combined actual-desired deviations of the manipulators.

The basic idea of the present invention is for an (external) measuring system to determine the relative mutual positioning of the manipulators and subsequently adapting the model data of one manipulator in such a way that there is both a compensation of its own errors and also of the errors of another manipulator. This procedure comprises a copying accuracy characteristics of one robot on at least one or all the further robots present. It consequently differs fundamentally from the presently practised, known procedures, in which all participating robots are made only approximately the same by individual, absolutely accurate measurement.

According to the invention the accuracy characteristics of one robot are copied on or transferred to another robot. This can take place by an iterative procedure for establishing a kinematic error model. The reference robot requires no error model, because the copying robot with its error model compensates both the error of the reference robot and also its own error. Thus, the invention implies the compensation of errors or the deliberate cutting in of kinematic inaccuracies for imaging (copying) accuracy characteristics of the reference robot, i.e. at least two robots are always involved and it is permitted to increase the kinematic error if this serves to copy or clone the positioning characteristics of another robot. The reference and copying robots move to the same point (desired or actual) in space, in order to be able to simply copy the accuracy characteristics.

By means of the invention, i.e. several robots in a chain can be calibrated to a world coordinate system, in that the first robot is calibrated on said world coordinate system as an absolutely accurately measured robot, the second robot then takes over the characteristics of the first robot, the third the characteristics of the second, etc. This ensures that robots remote from the origin of a world coordinate system can be calibrated to the latter with the resulting advantages of the offline programmability of the complete robot group.

According to a first development of the inventive method, for copying accuracy characteristics, in step c) the copying manipulator advances to the first desired poses of the reference manipulator determined in step a). In order in alternative manner to obtain a further improved coincidence of the accuracy characteristics, according to a further development of the inventive method, in step c) the copying manipulator advances to the first actual poses of the reference manipulator determined in step b). It can in particular be provided that the moving of the copying manipulator in step c) takes place under control by the external measuring system.

A preferred further development of the inventive method makes it possible to operate the reference manipulator and the copying manipulator substantially simultaneously, the desired and/or actual poses of the reference manipulator being transmitted to the copying manipulator by means of a suitably constructed link, particularly a data link, so that the time necessary for performing the inventive method can be minimized. The copying manipulator and reference manipulator can be located and operated in separate, but identical working cells, in order to largely exclude systematic influences of the accuracy characteristics.

However, according to a further development of the inventive method it is also possible to measure the robots to be measured in their actual working environment and constellation in which they are intended to subsequently cooperate. To this end, the copying manipulator carries the external measuring system, so that the latter is moved by the copying manipulator and preferably between the reference manipulator and the copying manipulator there is a mechanical forced coupling by means of the external measuring system, e.g. a force-moment sensor. Alternatively pose determination can also take place optically through the external measuring system.

In particular if the reference manipulator and copying manipulator are operated in time-shifted manner, e.g. successively in the same working cell on the same control device, the desired and/or actual poses of the reference manipulator are transmitted to the copying manipulator in stored form, e.g. on a changeable data carrier, so that according to a further development of the inventive method the first desired and actual poses of the reference manipulator are stored following the determination thereof.

For special applications, e.g. in order to emulate an "assembly line" or for copying the accuracy characteristics between a larger number of manipulators, according to the invention initially a first manipulator is selected as the reference manipulator and a second manipulator as a copying manipulator and subsequently the second manipulator functions as the reference manipulator and a further manipulator as the copying manipulator, etc.

According to corresponding further developments of an inventive device, at least one external measuring system is provided in stationary manner in operative connection with a working area of a manipulator and/or an external measuring system is located on a manipulator and is movable therewith.

According to a first preferred development of the inventive device, the external measuring system is constructed as an optical measuring system, the optical measuring system being constructed for determining all the degrees of freedom of a pose of the manipulators, e.g. during a construction as a stereo image processing system. Thus, in per se known, rapid and highly accurate manner it is possible to carry out an actual pose determination on the manipulators.

Specifically in the case of a simultaneous measurement of closely cooperating manipulators, it can be advantageous for precise movement matching if the jointly moved measuring system is constructed as a measuring system measuring by means of a mechanical forced coupling between the manipulators. In this connection, according to a highly preferred development of the inventive device, the jointly moved measuring system is constructed as a measuring system measuring by means of a mechanical forced coupling between manipulators. Alternatively a construction as a filament or wire measuring system is possible.

As a function of the measurement to be carried out, the manipulators can be located in common and/or separate working cells. In the case of separate working cells, according to a preferred development of the inventive device, there can be transmission means for data transmission between manipulators, particularly for the transmission of desired and/or actual poses.

In addition, an inventive device can have storage means at least for the desired and/or actual poses of a manipulator, as was mentioned hereinbefore.

BRIEF DESCRIPTION OF THE DRAWINGS

Further advantages and characteristics of the invention can be gathered from the following description of embodiments relative to the attached drawings, wherein show.

DETAILED DESCRIPTION OF THE DRAWINGS

Figure 1:
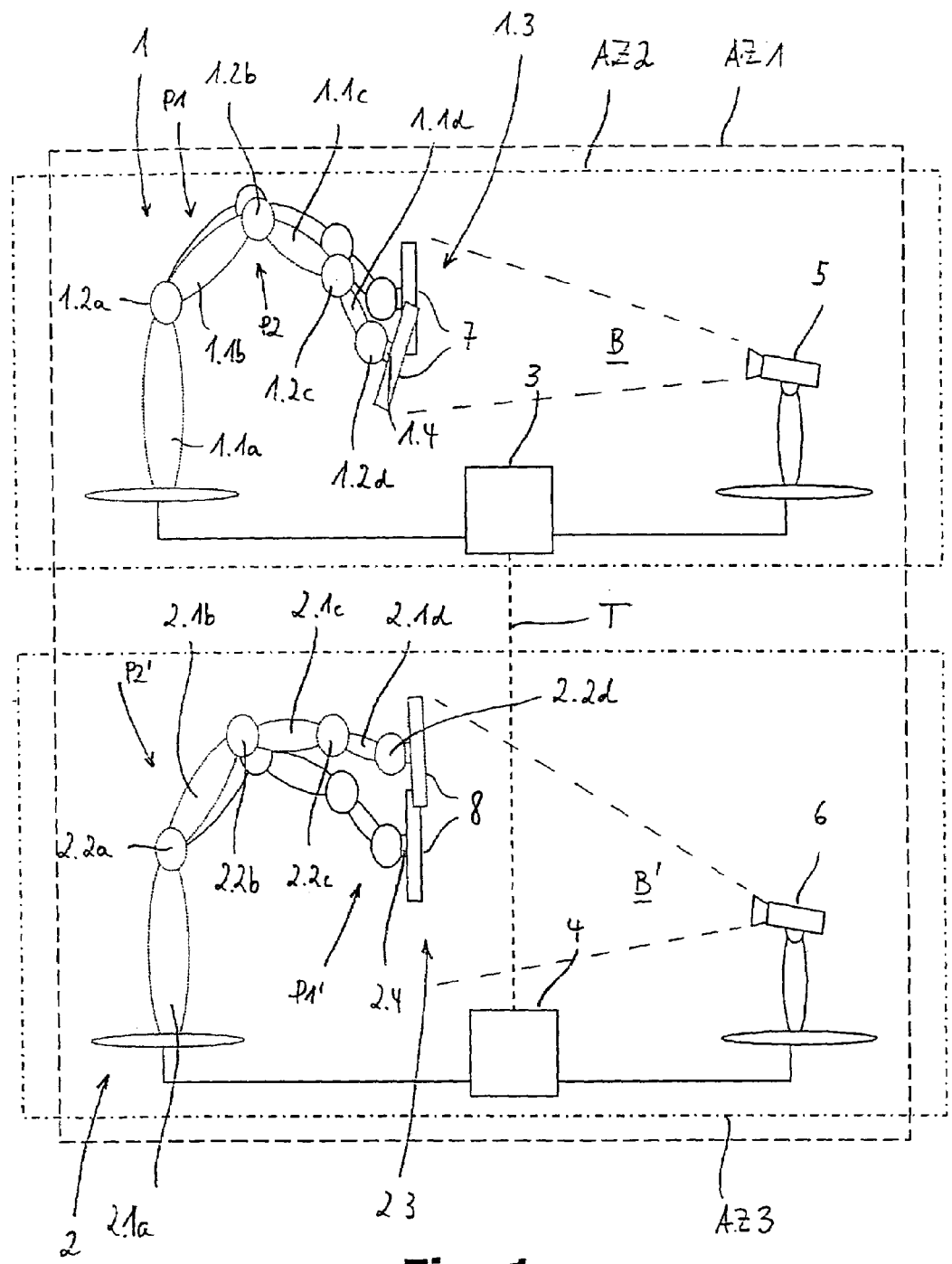
FIG. 1 Diagrammatically two manipulators in the form of multiaxial industrial robots with control devices and external measuring systems.

FIG. 1 diagrammatically shows two manipulators in the form of multiaxial or multiaxial industrial robots 1, 2 with in each case an associated control device 3, 4. FIG. 1 also shows two external measuring systems 5, 6, here in the form of optical camera systems, cooperating in each case with a robot 1, 2 and which, like the latter are operatively connected to the particular control device 3, 4. The control devices 3, 4 can be control-interconnected (represented in FIG. 1 by a broken connecting line T) or form a technical unit, this also applying to the external measuring systems 5, 6 (cf. FIG. 2).

The last-mentioned construction with a common external measuring system 5, 6 and/or a common control device 3, 4 is of particular relevance when the two manipulators 1, 2 are located in a common working cell AZ1, as symbolized by the broken line rectangle in FIG. 1. However, alternatively the two manipulators 1, 2 can be located in separate working cells AZ2, AZ3, as illustrated in FIG. 1 by the two dot-dash line rectangles. In the case of the separation of the working cells AZ2, AZ3, this can involve a spatial and/or a time separation, i.e. the robots 1, 2 can be simultaneously or in staggered manner located in spatially separated working cells, or can be operated successively (sequentially) in the same working cell. Particularly in the latter case the manipulators 1, 2 can be operated on the same control device 3 or 4.

In each case the robots 1, 2 have a plurality, only diagrammatically shown in the drawing, robot limbs or members 1.1a-d or 2.1a-d, which are linked by means of corresponding joints 1.2a-d and 2.2a-d. On a distal end 1.3, 2.3 of a robot arm in each case formed from said robot limbs is provided a hand flange 1.4, 2.4, to which is fixed a test plate 7, 8 (cf. FIG. 3a). As is shown further down in FIG. 2, the robots 1, 2 also have an internal measuring system 1.5, 2.5 for position values of the robot 1, 2, e.g. in the form of angle measuring means contained in the robot joints 1.2a-d, 2.2a-d.

In each case the robots 1, 2 are shown in two different poses P1, P2 or P1', P2' in FIG. 1. Pose P1, P1' (continuous lines in FIG. 1) designates an actual pose of robot 1 or 2, which can be determined according to the invention by the external measuring system 5 or 6. Pose P2, P2' (dotted lines in FIG. 1) designates the pose in which the particular robot 1, 2 thinks it is as a result of the internal measuring system 1.5, 2.5, e.g. the angle measuring means in joints 1.2a-d, 2.2a-d.

For the measurement of the poses P1, P1' of robots 1, 2, each of the external measuring systems has a measuring area B, B' defined in FIG. 1 by its range limits (broken lines). Within the areas B, B' the external measuring system 5, 6 can determine a pose P1, P1' of the robot 1, 2 by means of the position of the test plates 7, 8.

According to FIG. 1, it is possible for the external measuring system 5, 6 to determine pose deviations of the particular robot 1, 2 between the intended desired pose P2, P2' and the moved up to actual pose P1, P1' and which can in particular be used in accordance with a method described in a parallel patent application of the same applicant for determining an absolutely accurate parameter model for the particular robot 1, 2.

Figure 2:
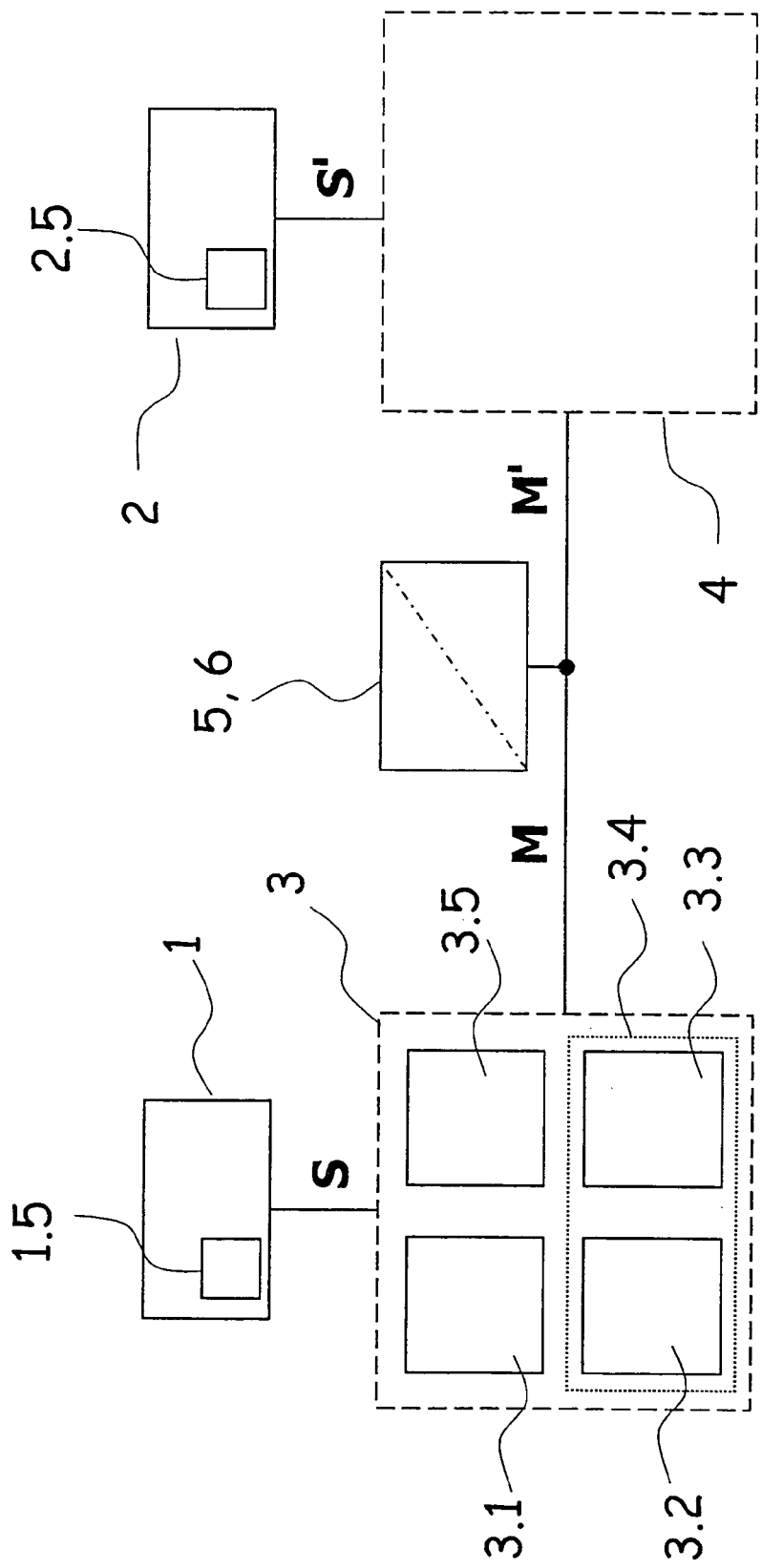
FIG. 2 A block diagram of an inventive device.

By means of a block diagram, FIG. 2 illustrates the inventive cooperation of robots 1, 2 and the control devices 3, 4, which are connected thereto, with the external measuring systems 5, 6, which are represented as a technical unit in the embodiment of FIG. 2. The control devices 3, 4 are connected to the particular robot 1, 2, particularly for the movement control thereof by control signals S, S'. There is also a connection of control device 3, 4 to the external measuring system 5, 6 by means of which the measured pose values M, M' can be transmitted from the external measuring systems 5, 6 to the control devices 3, 4, but also in the reverse direction control instructions for performing a measuring process through the external measuring system 5, 6 or the like.

The substantially identically constructed control devices 3, 4, whereof only one 3 is shown in detail in FIG. 2, in each case comprise storage means 3.1, which can in particular be non-volatile mass memories.

In addition, the control devices 3, 4 in each case incorporate a comparator device 3.2 and a computing or model forming device 3.3, which in the embodiment shown is in the form of a hardware unit constituted by a microprocessor 3.4 (dotted lines in FIG. 2). It is also possible to see the control means 3.5, whereby the latter can also constitute a not shown unit with the comparator devices 3.2 and the computing or model forming device 3.3.

The functions of the individual components of the control devices within the scope of the present invention are described in greater detail hereinafter.

Figure 3A:
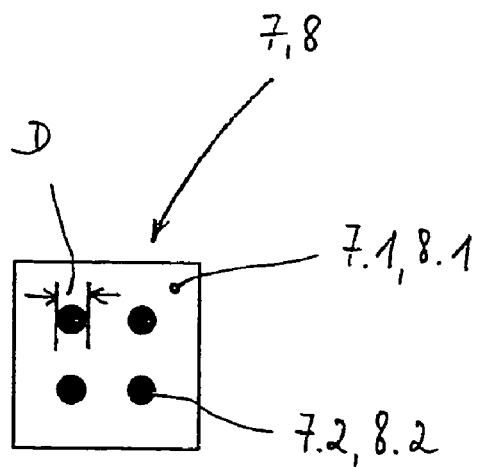
FIG. 3a A test plate located on a hand flange of the robot.

FIG. 3a shows in exemplified, diagrammatic manner a front view of the test plate 7, 8 of FIG. 1, roughly from the viewing direction of the external measuring system 5, 6. In the embodiment shown, the test plate 7, 8 is square and has on its front side 7.1, 8.1 a plurality of circular marks 7.2, 8.2, which are arranged in the same way as the dots or eyes of a dice in order to illustrate the number four in the square. The marks 7.2, 8.2 all have the same diameter D. Thus, through an absolute position of the test plate 7, 8 established through the external measuring system 5 6 (cf. FIG. 1), on the basis of absolute positions of the marks 7.2, 8.2 or apparent changes to the diameter D between the marks it is possible to determine a pose P1, P1' of robot 1, 2. Other methods for determining the 6D pose of a test plate are possible.

Figure 3B:
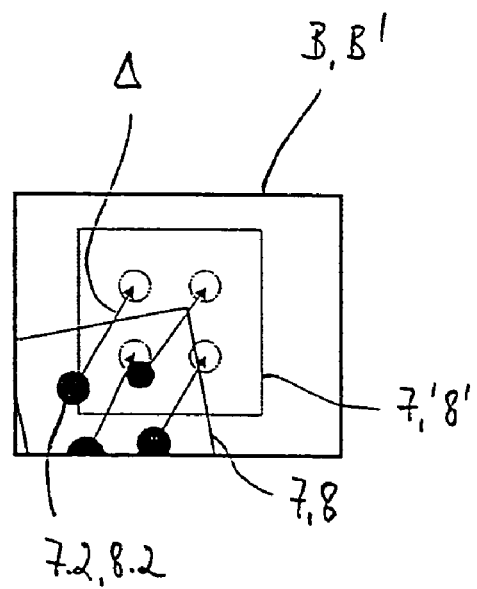
FIG. 3b Diagrammatically a determination of deviations performed in the inventive method.

This is in part diagrammatically illustrated in FIG. 3b. The rectangles therein designate the measuring area B, B' of the external measuring system 5, 6 (cf. FIG. 1). FIG. 3b shows an image recorded by the camera of one of the external measuring systems 5, 6. Besides the real test plate 7, 8, FIG. 3b also reveals a further, virtual test plate 7', 8' (in dotted line form), which symbolizes a preset pose of the robot 1, 2, i.e. a pose into which robot 1, 2 or test plate 7, 8 is to be moved as a function of the control means 3.5 in control device 3 (FIG. 2).

The arrows in FIG. 3b symbolize deviations of the actual pose P1, P1' (test plate 7, 8) with respect to the preset pose (test plate 7', 8'), as determined in the embodiment shown by the comparator means 3.2 of control device 3, after the external measuring system 5, 6 has transmitted all the test data M, M' to the control device 3, 4, as shown in FIG. 2. The marks 7.2, 8.2 on test plate 7, 8 are shown with different diameters in FIG. 3b, so that through a suitable image processing of the test data M, M' from the measuring area B, B' of the external measuring system 5, 6, e.g. in the comparator means 3.2 of control device 3 with software set up for this purpose, it is possible to determine actual deviations Δ in all degrees of freedom (here six) of robot 1, 2.

As described in the aforementioned, parallel patent application of the same applicant, the thus determined deviations Δ can subsequently be used through control means 3.5 of control device 3 for moving the robot 1, 2 by means of suitable control signals S, S' into an end pose in which the real test plate 7, 8 and the virtual test plate 7', 8' or the images thereof coincide except for a deviation tolerance resulting from the control device 3.

Hereinafter is described relative to FIG. 4 the sequence of a first inventive method for controlling a plurality of manipulators, particularly for copying accuracy characteristics of a robot. After starting the method in step S1, the first robot 1 shown in FIG. 1 and which according to the invention serves as the reference robot, advances in an introductory step S2 with its test plate 7 into a desired pose P2, predetermined by its control device 3, within its working area and stores the same in storage means 3.1. The pose to be moved up to can be preset during a measurement process effected by a not shown pose generator or can be derived from control programs which the robot 1 has to finish during its actual operation in the control device 3. In a subsequent step S3 the position of the test plate 7 in space is determined by means of the external measuring system 5. The thus determined actual pose of the test plate 7 or robot 1 in space is also stored in the storage means 3.1. This is followed in step S4 by an inquiry as to whether there has been a move up to sufficient measurement points (poses). If the inquiry is affirmed (j), the method is continued with step S5, otherwise (n), the method returns to step S2.

In step S5, in accordance with FIG. 1, the robot 2, hereinafter also called copying robot, covers a list of poses (points) stored by the reference robot 1, in that its control device 4 initially advances to the first stored desired pose of the reference robot (and subsequently during the further iteration each further point on the list). At the pose moved up to by the copying robot 2, in step S6 with the aid of the external measuring system 6 once again an actual pose of the test plate 8 is determined. From the deviations Δ (errors) resulting from said measurements in steps S3 and S6 and in the same way as in FIG. 3b, it is possible for the computing means 3.3 of control device 3, functioning according to the invention as a model forming device, or corresponding means in control device 4, in step 7 a parameter model for the copying robot 2 is determined. During subsequent use, as a result of said parameter model the copying robot 2 does not assume the pose originally preset by its control device 4, but instead the actual pose P1 reached by the reference robot 1. Thus, the absolutely accurate model of the copying robot 2 simultaneously compensates its own errors and also the errors of the reference robot 1. Thus, during subsequent operation, the copying robot 2 accurately moves up to those points or poses to which the reference robot 1 moves or would move.

Figure 4:
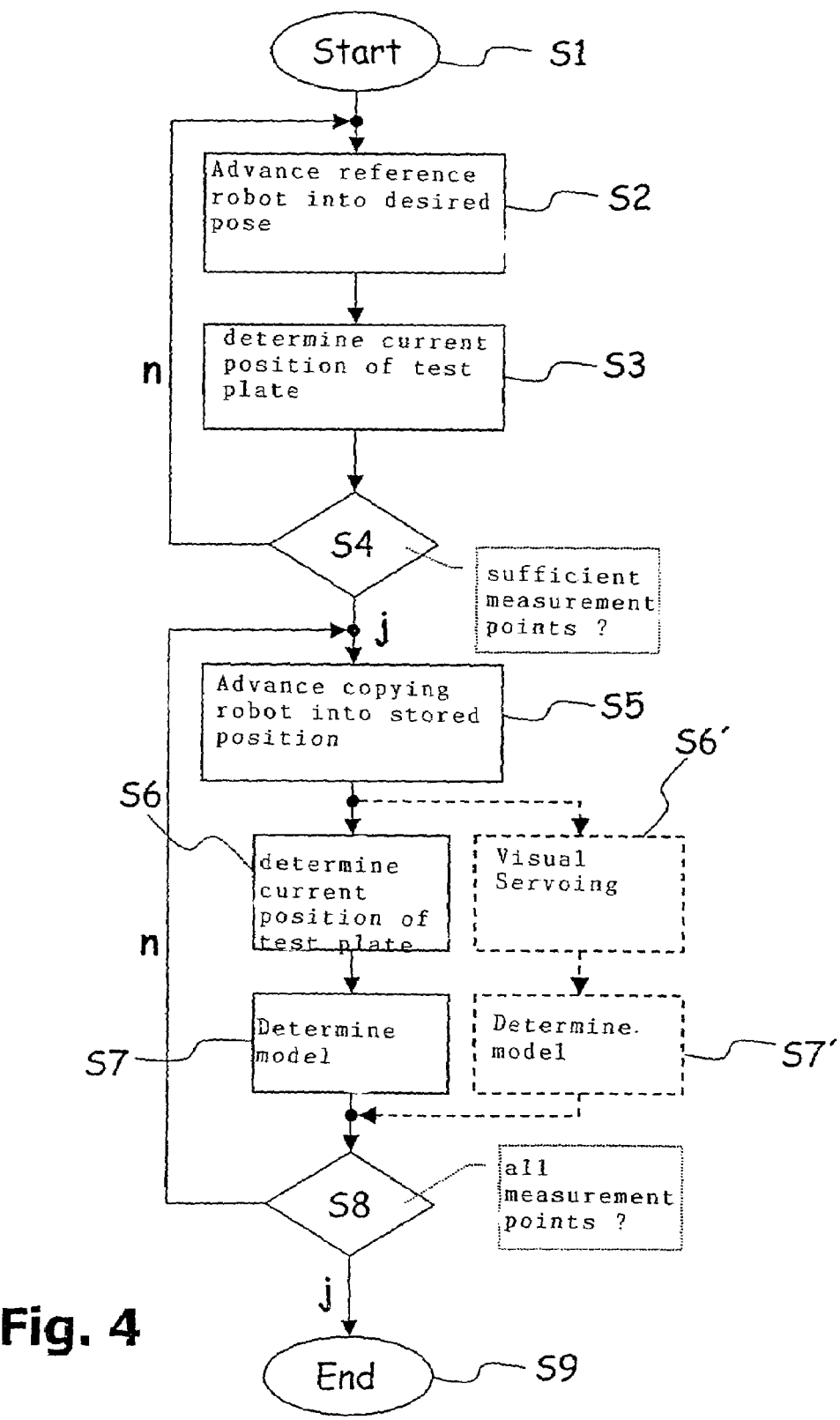
FIG. 4 A flowchart of a first variant of the inventive method.

Then, in step S8 according to FIG. 4, there is an inquiry as to whether all the measurement points of the list have been covered. If this is the case (j), the method ends in step S9, otherwise (n) the method is continued with step S5.

FIG. 4 shows in broken line form (method steps S6', S7') a further, alternative development of the inventive method. The method steps S1-S5 correspond to those described hereinbefore. At the start of S6' the copying robot 2 is nominally, according to the internal position value information of its control device 4, at the same position as that previously occupied by the reference robot 1. With the aid of a local search algorithm, preferably an image-based (visual servoing) method according to FIG. 3b, in which the test plate 8 of the copying robot 2 is moved as a function of the external measuring system 6 for minimizing deviations Δ in the measurement area B' of the external measuring system 6, the copying robot 2 can be positioned in space in such a way that its pose substantially exactly corresponds to the actual pose of the reference robot 1 determined with the external measuring system. The real-measured test plate 7 of reference robot 1 e.g. corresponds to the virtual test plate 8' for copying robot 2 shown in FIG. 3b.

The above-described method can fundamentally also be used in individual manipulators for producing absolutely accurate parameter models, which is disclosed in detail in the aforementioned parallel application of the same applicant, so that to this extent reference can be made to its disclosure.

Thus, for the following method step S7', the space positions moved up to by the copying robot 2 can now be directly determined by means of its own, internal measuring system 2.5 (FIG. 2). Thus, as in the above-described method step S7, with the aid of an absolutely accurate robot model to be determined errors compared with the reference robot 1 can be compensated. Thus, in future, a use of this model the robot 2 does not assume a pose originally preset by its control unit 4, but instead a position actually reached by the robot 1, i.e. the absolutely accurate parameter model of the copying robot 2 compensates both its own errors and those of the reference robot 1 and in subsequent operation will accurately advance to those points to which the reference robot 1 advances or would advance.

The method is then continued according to the second alternative with the above-explained method step S8.

In connection with the two above-described method types, it can be stated that the copying robot 2 instead of the reference robot 1 is placed in the same measuring or working cell and can be operated on the same control device 3, 4 as the reference robot 1. This is illustrated in FIG. 1 by the time-separated working cells AZ2, AZ3. Alternatively the copying robot 2 can be located in an identical cell parallel to the measuring or working cell of the reference robot 1 (spatially separated cells AZ2, AZ3 in FIG. 1) and the stored positions and test data of the reference robot 1 are communicated to it by means of a data file and/or a suitable data link, e.g. the Ethernet or the like (broken, vertical line T between the control devices 3, 4 in FIG. 1).

Through the other type of measurement in the second method variant shown (local search algorithm in step S6'), the model parameters obtained will have a higher quality to those of the first method variant, because during the measuring process the actual poses of robots 1, 2 are compared and/or equated, so that it does not only apply to the desired poses regularly influenced by manipulator tolerances.

The above-described method types are in particular suitable for the measurement of an individual robot 2, e.g. by the manufacturer. The robot 2 to be measured is located at the same point as the reference robot 1 and ideally also uses the same measuring device, the external measuring system and optionally the control device in order to exclude systematic measurement errors.

Figure 5A:
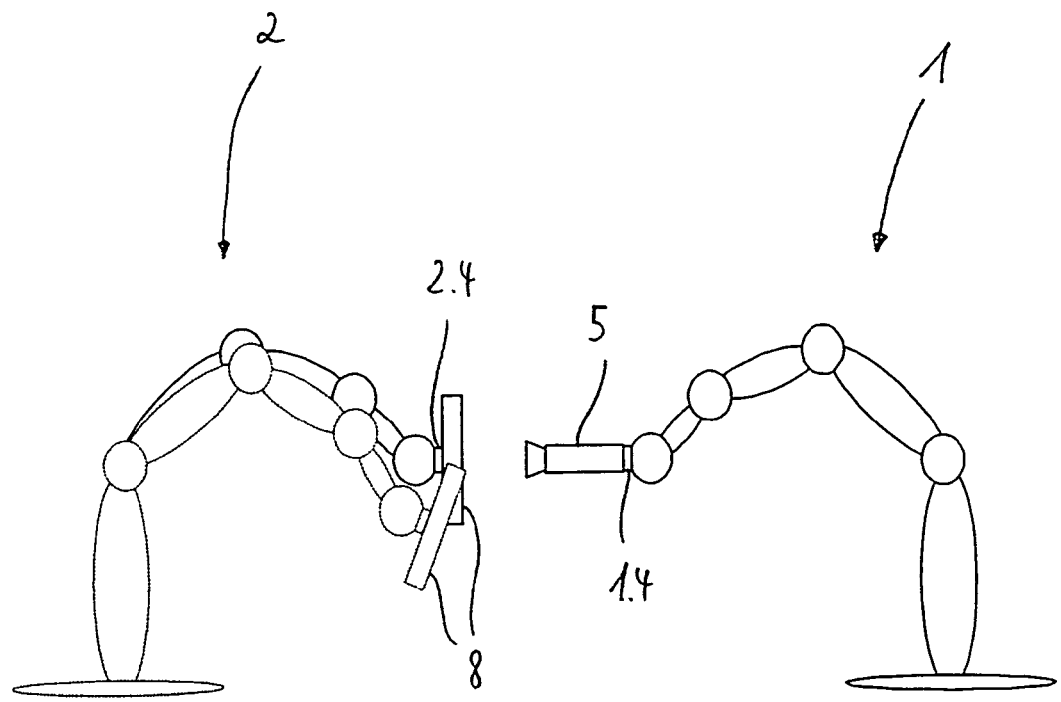
FIG. 5a Two manipulators, whereof one carries a jointly moved, external measuring system.

FIG. 5a, b shows a further method variant, in which the robots 1, 2 to be measured (generally n robots, here specifically n=2) are jointly located in the working cell or are set up by the manufacturer in a constellation in which they will also subsequently cooperate. In the same way as the subsequently described, further copying method for accuracy characteristics in the case of two robots, a chain of n robots, which operate successively and in mutually matched manner in a cell or plant (e.g. to emulate an "assembly line"), can be matched to one another as a whole, if initially robot 2 is matched to robot 1, then robot 3 to robot 2, etc.

Figure 5B:
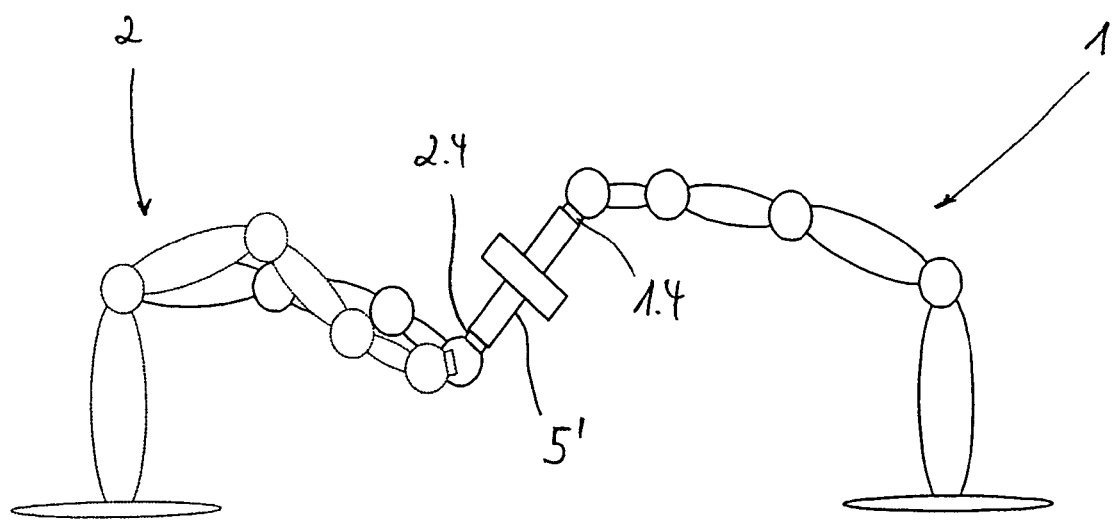
FIG. 5b Two mechanically forcibly coupled manipulators.

For this purpose the robots 1, 2 to be measured and as shown in FIGS. 5 and 5b are closely coupled together, in that for the determination of actual poses use is made of an external measuring system 5, 5', which is located on at least one robot and is movable together therewith. For this purpose, according to FIG. 5a, reference robot 1 carries on its hand flange 1.4 an external measuring system 5, e.g. an optically measuring measuring system, as described hereinbefore relative to FIG. 3b. On its hand flange the copying robot 2 has a test plate 8. A control architecture of the robots 1, 2 is not shown in FIGS. 5a, 5b so as not to overburden representation (cf. FIGS. 1, 2). It is unimportant where the measuring system is located and which robot or measuring device control evaluates the signals from the measuring device. In an optical method the situation is such that the camera can be located on one robot and the test plate on the other robot.

In the development according to FIG. 5b, the reference robot 1 and copying robot 2 are mechanically forcibly coupled by means of an external measuring system 5' in the form of a force-moment sensor, i.e. by means of the external measuring system 5' there is a direct force coupling between the two robots 1, 2. In an alternative development, the external measuring system 5' of FIG. 5b can also be in the form of a filament or wire measuring system, which is directly fixed to the two flanges 1.4, 2.4 of robots 1, 2 and is able to determine spacings and relative orientations between the two flanges.

The fundamental principle of the subsequently described method is that the reference robot 1 presets a position or path, which is directly followed by the copying robot 2. The servomechanism is designed in such a way that the hand flanges 1.4, 2.4 of robots 1, 2 have a desired mutual spacing and angle such as is required in subsequent operation. This can either be the situation at discreet positions in space or during the entire robot path covered. The above-described measuring method has the decisive advantage that all the errors which can be caused by the different robot poses can be compensated by the absolutely accurate model of the copying robot 2. It is also possible for not shown tools to remain flanged to the robots in the cell, provided that additional fastening possibilities for the external measuring systems 5, 5' are created. This makes it possible to take account of the load conditions on the robots in the same way as during subsequent, real operation, so that the cooperating robots can be matched even more accurately to one another.

The specific sequence of the method is subsequently described relative to the flowchart of FIG. 6 and where, without restricting the general nature thereof reference is made to a single copying robot, although in the case of cooperating robots more than two robots cooperate in performing a task. In the described development of the inventive method, on the control device 4 of copying robot 2 there is a servoing algorithm which, based on test data M supplied by the reference robot 1 (FIG. 2) maintains a clearly defined spacing and orientation with respect to the reference robot 1. In the case of a visual servoing algorithm (FIG. 3b), the aim is to maintain clearly defined features 7.2, 8.2, e.g. on a test plate 7, 8 at reference robot 1 at the same point of a image detail B, B'. In the case of a mechanical coupling by means of a force-moment sensor 5' according to FIG. 5b the alternative aim is to so position the copying robot 2 that in spite of the mechanical coupling neither forces, nor moments are transmitted between the robots.

Figure 6:
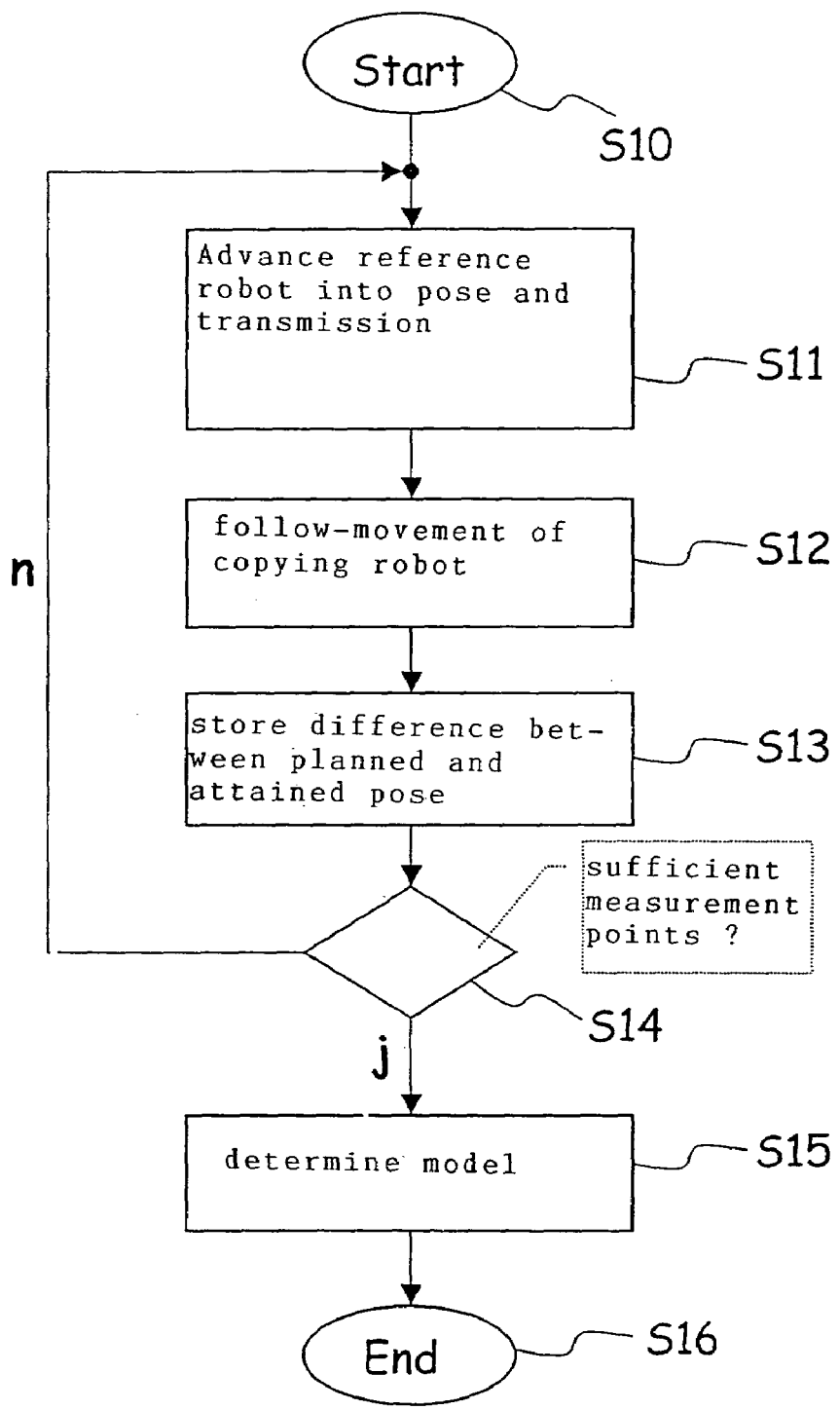
FIG. 6 A flowchart of a second variant of the inventive method.

According to FIG. 6 the inventive method starts in step S10 and then in step S11 reference robot 1 advances to a pose within its working area and this is transmitted to the copying robot 2. As described hereinbefore, the pose to be moved up to can be preset during a measuring process performed by a not shown pose generator, or can be derived from control programs which have to be covered by the cooperating robots. Then, in step S12, copying robot 2 follows the movement of reference robot 1. If there is no mechanical coupling of robots 1, 2, this can take place in time-decoupled manner, i.e. firstly the reference robot 1 moves into the desired position and this is followed by the copying robot 2. In the case of a suitable servomechanism supportable by path planning, the copying robot 2 can directly follow the reference robot 1. However, in the case of mechanical coupling direct following is unavoidable so as not to damage the measuring system 5' or robots 1, 2. The copying robot 2 regulates its position with the test data and path informations supplied by the reference robot 1 in such a way that the copying robot 2 assumes the previously defined pose relative to the reference robot 1. The pose now assumed by the copying robot 2 (continuous line in FIG. 5a, b) generally does not coincide with the pose which it would have assumed if a movement to the planned point in space had taken place along the originally planned path. The difference between the planned pose (dotted line in FIG. 5a, b) and the actually attained pose (continuous line) is stored in step S13 together with internal position values (angle measuring means) of robots 1, 2.

In step S4 there is then an inquiry as to whether sufficient test points have been moved up to. If this inquiry is affirmed (j), the method is continued with step S15. Otherwise (n) the method returns to step S11. This is followed in S15 by the determination of the absolutely accurate parameter model for the copying robot 2 from the previously recorded test data, preferably in the model forming device 4.3 in control device 4. Like the alternative method explained relative to FIG. 4, the aforementioned method is suitable for also compensating the errors of the reference robot 1.

When using the described, inventive method, it is possible to build up an automation plant with inexpensive standard robots, where a determination and copying of accuracy characteristics only has to take place on replacing a robot. Production can continue without further surveying or calibrating processes or program changes. Alternatively, prior to the start of production, it is possible to build up a data bank filing the positioning characteristics of all the robots, so that as required the copying informations can be rapidly and simply removed.

As a result of the described copying of accuracy characteristics, specifically cooperating robots can be very accurately matched to one another, because each is not merely constructed in limited absolutely accurate manner and instead all the robots have precisely the same positioning and path travel characteristics.

REFERENCE NUMERALS LIST

1 Robot
1.1a-d Robot limb
1.2a-d Robot joint
1.3 Distal end
1.4 Hand flange
1.5 Internal measuring system
2 Robot
2.1 a-d Robot limb
2.2a-d Robot joint
2.3 Distal end
2.4 Hand flange
2.5 Internal measuring system
3, 4 Control device
3.1 Storage means
3.2 Comparator device
3.3 Computing device
3.4 Microprocessor
3.5 Control means
5, 6 External measuring system 7, 8 Test plate
7', 8' Virtual test plate
7.1, 8.1 Front side
7.2, 8.2 Mark
AZ1, AZ2, Working cell AZ3
B, B' Measuring area
D Diameter
Δ Deviation
j Affirmed inquiry
M, M' Test signal
n Negated inquiry
P1, P1' Actual pose
P2, P2' Desired pose
S, S' Control signal
S1-S16 Method steps
T Link

The invention claimed is:

1. A method for controlling a plurality of multiaxial robots, the method comprising:
 a) providing a plurality of multiaxial robots, at least one of said multiaxial robots functioning as a reference manipulator and at least another one of said multiaxial robots functioning as a copying manipulator;
 b) moving said reference manipulator into a plurality of predetermined poses within a working area of said reference manipulator, wherein internal position values of said reference manipulator are determined in said working area, said internal position values corresponding to first desired poses;
 c) determining a first actual pose of said reference manipulator with a first external measuring system for each of said first desired poses from step b);
 d) moving said copying manipulator to second desired poses, said second desired poses corresponding to said first desired poses determined by the reference manipulator, said copying manipulator moving independently from said reference manipulator;
 e) determining a second actual pose of said copying manipulator with a second external measuring system for each of said second desired poses in step c); and
 f) determining a parameter model for said copying manipulator based on actual-desired deviations between said first desired and said first actual poses of said reference manipulator and said second desired and said second actual poses of the copying manipulator such that said parameter model compensates for errors of said copying manipulator and errors of said reference manipulator.

2. A method according to claim 1, wherein in step d) said copying manipulator advances to the first desired poses of the reference manipulator preset in step b).

3. A method according to claim 1, wherein in step d) said copying manipulator advances to said first actual poses of said reference manipulator determined in step c).

4. A method according to claim 3, wherein said copying manipulator is moved until a pose thereof and the actual pose of the reference manipulator coincide within the framework of the preset deviation tolerances and/or a preset displacement or offset.

5. A method according to claim 4, wherein the movement of said copying manipulator in step d) takes place as a function of the second external measuring system.

6. A method according to claim 1, wherein the operation of the reference manipulator and the copying manipulator takes place substantially simultaneously, the desired and/or actual pose of the reference manipulator being transmitted to the copying manipulator by means of a link, said link comprising a data link.

7. A method according to claim 1, wherein the copying manipulator carries the second external measuring system, so that the second external measuring system is jointly moved by said copying manipulator.

8. A method according to claim 1, wherein a pose determination by the first external measuring system and said second external measuring system takes place optically.

9. A method according to claim 1, wherein said reference manipulator and said copying manipulator are operated in a common working cell.

10. A method according to claim 1, wherein said copying manipulator is operated in a further working cell identical to said reference manipulator working cell.

11. A method according to claim 1, wherein the first desired and actual poses of the reference manipulator are stored following their determination.

12. A method according to claim 11, wherein the reference manipulator and copying manipulator are operated in time-staggered manner, the desired and/or actual poses of the reference manipulator being transmitted in stored form to the copying manipulator.

13. A method according to claim 11, wherein said reference manipulator and said copying manipulator are operated successively in one working cell on the same control device.

14. A method according to one of the preceding claims, wherein initially a first manipulator is selected as the reference manipulator and a second manipulator as the copying manipulator, subsequently the second manipulator functioning as the reference manipulator and a further manipulator functioning as the copying manipulator.

15. A device for improving accuracy characteristics of multiaxial robots, the device comprising:
 at least two manipulators comprising a reference robot and a copying manipulator;
 at least one control device for moving said reference robot independently from said copying manipulator into predetermined desired poses;
 at least one external measuring system, said at least one external measuring system determining reference robot actual poses of said reference robot and manipulator actual poses of said copying manipulator, said reference robot actual poses corresponding to reference robot desired poses of said reference robot, said manipulator actual poses corresponding to copying manipulator desired poses,
 a comparator device for determining a deviation between the desired and actual poses of one or more of said reference robot and said copying manipulator; and
 a model forming device for determining a parameter model of at least one of said reference robot and said copying manipulator based on said deviation between said copying manipulator desired poses and said manipulator actual poses and said deviation between said reference robot desired poses and said reference robot actual poses.

16. A device according to claim 15, wherein at least one external measuring system is arranged in a stationary manner and operatively connected to a working area of a manipulator.

17. A device according to claim 15, wherein an external measuring system is located on one of said reference robot and said copying manipulator and is movable therewith.

18. A device according to claim 17, wherein the measuring system is a filament or wire measuring system.

19. A device according to claim 15, further comprising an external measuring system, said external measuring system being an optical measuring system.

20. A device according to claim 19, wherein the optical measuring system determines all the degrees of freedom of a pose of said reference robot and said copying manipulator.

21. A device according to claim 19, wherein the external measuring system is a stereo image processing system.

22. A device according to claim 15, further comprising a common working cell for the simultaneous operation of said reference robot and said copying manipulator.

23. A device according to claim 15, further comprising separate working cells for said reference robot and said copying manipulator.

24. A device according to claim 15, further comprising transmission means for transmitting data between said reference robot and said copying manipulator, said data comprising desired and/or actual poses and internal position values.

25. A device according to claim 15, further comprising a storage means for storing at least desired and/or actual poses of one or more of said reference robot and said copying manipulator.

26. A device according to claim 25, further comprising a working cell for the sequential operation of said reference robot and said copying manipulator, said reference robot and said copying manipulator being controlled via the same control device.

27. A method for controlling a plurality of multiaxial robots, the method comprising:
providing a plurality of multiaxial robots comprising a reference manipulator and a copying manipulator;
determining a plurality of first desired poses of said reference manipulator;
moving said reference manipulator to said plurality of first desired poses within a working area of said reference manipulator;
determining a plurality of first actual poses of said reference manipulator via a first external measuring system when said reference manipulator is moved to said plurality of first desired poses, each of said first actual poses being associated with one of said first desired poses;
moving said copying manipulator to a plurality of second desired poses, said second desired poses corresponding to said first desired poses, said copying manipulator moving independently from said reference manipulator;
determining a plurality of second actual poses of said copying manipulator via a second external measuring system when said copying manipulator is moved to said plurality of second desired poses, each of said second actual poses being associated with one of said second desired poses;
determining a reference manipulator deviation between said first desired poses and said first actual poses of said reference manipulator;
determining a copying manipulator deviation between said second desired poses and said second actual poses of said copying manipulator;
creating a parameter model for said copying manipulator based on said reference manipulator deviation and said copying manipulator deviation;
compensating for deviations between said first desired poses and said first actual poses of said reference manipulator and for deviations between said second desired poses and said second actual poses of said copying manipulator by using the parameter model.

28. A method according to claim 27, wherein said copying manipulator is moved until a pose thereof and the actual pose of the reference manipulator coincide within a preset deviation tolerance and/or a preset displacement or offset.

29. A method according to claim 28, wherein said copying manipulator is moved as a function of the second external measuring system.

* * * * *